United States Patent Office

3,385,765
Patented May 28, 1968

3,385,765
NOVEL PROCESS OF PRODUCING 1,3,4,10,11,12-HEXAHYDROXY - 6 - METHYLNAPHTHACENE-2-CARBOXAMIDE
Jerry Robert Daniel McCormick, Spring Valley, Ursula Joachim, White Plains, and Elmer Raymond Jensen, Nanuet, N.Y., and Newell Oscar Sjolander, Saddle River, N.J., assignors to American Cyanamid Company, Stamford, Conn., a corporation of Maine
No Drawing. Filed Feb. 3, 1965, Ser. No. 430,184
3 Claims. (Cl. 195—80)

ABSTRACT OF THE DISCLOSURE 1,3,4,10,11,12 - hexahydroxy - 6-methylnaphthacene-2-carboxamide and 6,11-dehydro-11-keto-6-methyl-3,6,10,12 - tetrahydroxynaphthacene-1,4-quinone-2-carboxamide are produced and recovered from the submerged aerobic fermentation of blocked mutants of *Streptomyces aureofaciens*.

---

This invention relates to a novel process of producing 1,3,4,10,11,12 - hexahydroxy - 6 - methylnaphthacene - 2-carboxamide and, more particularly, is concerned with the production of 1,3,4,10,11,12-hexahydroxy-6-methylnaphthacene-2-carboxamide by the submerged aerobic fermentation of certain blocked mutants of *Streptomyces aureofaciens*.

The present invention is based upon the discovery that selected strains of *S. aureofaciens* are capable of the simultaneous fermentative biosynthesis of a major proportion of 1,3,4,10,11,12-hexahydroxy-6-methylnaphthacene-2-carboxamide together with a lesser proportion of 6,11 - dihydro - 11-keto-6-methyl-3,6,10,12-tetrahydroxynaphthacene-1,4-quinone-2-carboxamide as a by-product.

Strains useful for this purpose can be recognized by the green color of colonies on corn steep liquor-containing agar, and by the green color of fermentation harvest mashes when grown in corn steep liquor-containing liquid media. These strains can be further characterized by the appearance of a broad ultraviolet absorption maximum peaking at 450–470 millimicrons when the ultraviolet absorption spectrum is run on a 0.2 N hydrochloric acid-in-dimethylformamide extract of the whole harvest mash. This is accomplished by diluting 5 ml. of the whole harvest mash to 50 ml. with a 0.2 N solution of hydrogen chloride in dimethylformamide, and then filtering through No. 12 Whatman filter paper. Readings are made on the filtrate in a one-centimeter cell in a Cary Recording Spectrophotometer, Model 11. If necessary, further dilution of the filtrate with a 0.1 N solution of hydrogen chloride in dimethylformamide may be made in order to give spectrophotometric absorbency readings between 0.25 and 1.50 in the region of 450–470 m$\mu$ maxima.

A number of strains which produce these two compounds have been obtained by selection from, and mutation of, *S. aureofaciens* parental strains, such parental strains being characterized by the ability to produce either tetracycline or 7-chlorotetracycline. Representative strains which may be used to practice this invention are *S. aureofaciens* S730–6, V1383, V655 and S294–4. The latter two strains have been deposited as NRRL 3132 at the Northern Regional Research Laboratories, Peoria, Ill., and as ATCC 10762b at the American Type Culture Collection, Washington, D.C., respectively. Further operative strains may be readily found by the usual methods of strain selection.

The conditions of the fermentation are generally the same as the presently known methods of producing tetracycline, 7-chlorotetracycline or 5-hydroxytetracycline by fermentation. That is, the fermentation medium contains the usual nutrients and mineral substances. Suitable nutrient substances include starch, dextrose, cane sugar, glucose, molasses, soybean meal, peanut meal, yeast, meat extracts, peptone, ammonium sulfate, urea, corn steep liquor, distillers' solubles, wheat gluten, cottonseed meal, inorganic salts and other conventional substances. The inorganic salts include calcium carbonate, ammonium sulfate, ammonium chloride and the various trace elements such as manganese, cobalt, zinc, copper, iron and the like.

The other general conditions of the fermentation, such as hydrogen ion concentration, temperature, time, rate of aeration, alternative methods for preparation of the inoculum, sterilization, inoculation and the like are conventional and may be similar to those conditions used for the production of 7-chlorotetracycline shown in U.S. Patent No. 2,482,055 to Duggar; for the production of tetracycline shown in U.S. Patent No. 2,734,018 to Minieri et al. and for the production of 5-hydroxytetracycline shown in U.S. Patent No. 2,516,080 to Sobin et al.

A suitable inoculum may be obtained by employing spores of the proper strain of *S. aureofaciens*, propagated on agar slants or Roux bottles, to inoculate a nutrient medium contained in shaker flasks or bottles. After incubation, this inoculum is transferred to a larger volume of nutrient medium in a seed tank. After allowing sufficient time for the culture to develop, the seed tank growth is transferred to a fermentor, under aseptic conditions, and the fermentation is continued for a suitable period of time.

The recovery of the 1,3,4,10,11,12-hexahydroxy-6-methylnaphthacene-2-carboxamide from the whole harvest mash may be achieved by extraction with tetrahydrofuran. The 6,11-dihydro-11-keto-6-methyl-3,6,10,12-tetrahydroxynaphthacene-1,4-quinone-2 - carboxamide remains in the mother liquor and may be isolated either by evaporation or by dilution and precipitation with a non-solvent.

The compound 6,11-dihydro-11-keto-6-methyl-3,6,10,12 - tetrahydroxynaphthacene-1,4-quinone-2-carboxamide is a crystalline product which dissolves in alkali with an emerald green color and which has the following characteristic absorption maxima:

$\lambda_{max.}^{conc.}$ $H_2SO_4$—1% boric acid, 275 (shoulder), 310, 472 (shoulder), 535.

This compound, 6,11-dihydro-11-keto-6-methyl-3,6,10,12-tetrahydroxynaphthacene-1,4-quinone-2-carboxamide, is a new compound and its utility lies in the fact that it may be converted to 1,3,4,10,11,12 - hexahydroxy - 6 - methylnaphthacene-2-carboxamide by heating in a solvent such as phenol with an acidic reducing agent such as hydriodic acid, tin-hydrochloric acid, or hypophosphorous acid.

The 1,3,4,10,11,12-hexahydroxy-6-methylnaphthacene-2-carboxamide is useful as an intermediate in the synthesis of physiologically active antibiotics of the tetracycline series. For example, 1,3,4,10,11,12-hexahydroxy-6-methylnaphthacene-2-carboxamide may be biologically transformed to tetracyclines as set forth in the following reaction scheme:

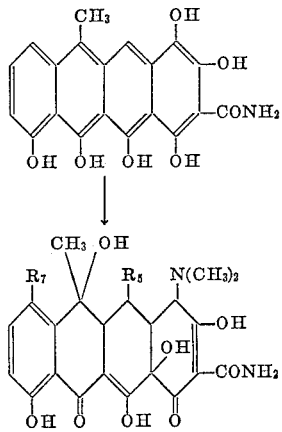

wherein $R_5$ is hydrogen or hydroxy and $R_7$ is hydrogen, chlorine or bromine. This transformation (which in its simplest form consists of the net addition of two moles of water, one at 4a,12a and one at 5a,6a; and the replacement of the 4-hydroxyl group by a dimethylamino group) is accomplished by adding 1,3,4,10,11,12-hexahydroxy-6-methylnaphthacene - 2 - carboxamide to a fermentation medium inoculated with a strain of a species of the genus Streptomyces, which species is capable of producing one of the tetracyclines. Certain other biological transformations may be accomplished simultaneously with the 5a,6a- and 4a,12a-dihydration and the introduction of the 4-dimethylamino group. Where a 5-hydroxylating species of the genus Streptomyces is employed, then a hydroxyl group is introduced at the 5-position. Where a halogenating strain of the genus Streptomyces is employed, then $R_7$ is chlorine or bromine depending upon the conditions of the fermentation. Among the strains of *S. aureofaciens* which will introduce chlorine or bromine at the 7-position of the molecule are the following:

S. aureofaciens

| | |
|---|---|
| ATCC 10762a | ATCC 13189 |
| ATCC 10762g | ATCC 13899 |
| ATCC 10762i | ATCC 13900 |
| ATCC 11989 | NRRL B–1286 |
| ATCC 12416b | NRRL B–1287 |
| ATCC 12416c | NRRL B–1288 |
| ATCC 12416d | NRRL B–2209 |
| ATCC 12551 | NRRL B–2406 |
| ATCC 12552 | NRRL B–2407 |
| ATCC 12553 | NRRL 3013 |
| ATCC 12554 | |

A representative strain of the genus Streptomyces which is a non-halogenating strain, that is, which will not introduce halogen at the 7-position of the molecule, is *S. aureofaciens* NRRL 3014. Representative strains of the genus Streptomyces which are non-halogenating strains but which will introduce a hydroxy group at the 5-position of the molecule, are *S. rimosus* NRRL 2234, *S. platensis* NRRL 2364 and *S. hygroscopicus* NRRL 3015.

The conditions of the fermentation for the biological conversion of 1,3,4,10,11,12-hexahydroxy-6-methylnaphthacene-2-carboxamide to tetracyclines are generally the same as set forth in U.S. Patent 2,482,055 to Duggar, U.S. Patent 2,734,018 to Minieri et al. and U.S. Patent 2,878,289 to McCormick et al. and which, in turn, are generally the same as for the presently known methods for producing various tetracyclines by fermentation. That is, the fermentation medium contains the usual nutrients and mineral substances. Suitable nutrients include any assimilable source of carbon, such as the polysaccharides or starches, or polyalcohols such as glycerol may be used. An assimilable source of nitrogen may be supplied through the use of proteins, protein hydrolysates, urea, corn steep liquor, meat extracts, peptone, distillers solubles, fish meal and other conventional substances. The common essential anions and cations are supplied in the form of their non-toxic salts. Trace elements such as manganese, cobalt, zinc, copper, etc., are obtained either as impurities in the above compounds, or through the use of tap water or by specifically adding solutions especially enriched with these trace elements.

The other general conditions of the fermentation such as hydrogen ion concentration, temperature, time, rate of aeration, preparation of the inoculum, sterilization, inoculation and the like are conventional and are similar to those for the production of other tetracyclines as set forth in the aforementioned U.S. Patents to Duggar, Minieri et al. and McCormick et al.

When a 7-halogenating strain of the genus Streptomyces is employed with 1,3,4,10,11,12-hexahydroxy-6-methylnaphthacene-2-carboxamide, it is necessary only to modify the fermentation medium so that it contains at least 10 parts per million of chloride ions when the 7-chloro substituent is desired, or a like amount of bromide ions when the 7-bromo substituent is desired.

After the fermentation has been continued for a suitable time, for example, from 12 to 96 hours, and the transformation of 1,3,4,10,11,12 - hexadroxy - 6 - methylnapthacene-2-carboxamide to the desired tetracycline is substantially complete, the tetracycline product may be isolated from the fermentation mash in any convenient manner. The isolation process may be selected from any of the numerous isolation techniques now well known in the art.

The starting material may be added at any desired concentration, although for practical reasons a substrate at a concentration of up to about 10 grams per liter of medium is satisfactory although higher concentrations may be used with some sacrifice in yield. The addition of the starting material may be accomplished in any suitable manner so long as it promotes contact with the biological medium. To this end, it is preferred to add the starting material in a solvent such as dimethylformamide, dimethylacetamide, dimethylsulfoxide, tetramethylenesulfoxide and N-methylpyrrolidone. However, dimethylsulfoxide is preferred and a solution of magnesium acetate in dimethylsulfoxide is the most preferred solvent for the starting material. Solutions of the 1,3,4,10,11,12-hexahydroxy-6-methylnaphthacene-2-carboxamide must be protected from air as the compounds are readily oxidized in solution.

The invention will be described in greater detail in conjunction with the following specific examples.

EXAMPLE 1

Preparation of 1,3,4,10,11,12-hexahydroxy-6-methylnaphthacene-2-carboxamide

Spores of *S. aureofaciens* NRRL 3132 were washed from an agar slant with sterile distilled water to form a suspension containing 60 million to 80 million spores per ml. A 0.33 ml. portion of this suspension was used to inoculate an 8 inch test tube containing 8 ml. of a medium prepared according to the following formulation:

| | Grams |
|---|---|
| Sucrose | 30 |
| Ammonium sulfate | 2 |
| Calcium carbonate | 7 |
| Cornsteep liquor | 20 |
| Tap water, qs. to 1000 milliliters. | |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of the *S. aureofaciens* was obtained. A fermentation medium of the following composition was prepared:

| | |
|---|---:|
| Cottonseed flour | grams__ 35.0 |
| Corn starch | do____ 50.0 |
| Calcium carbonate | do____ 8.0 |
| Yeast | do____ 1.0 |
| Ammonium chloride | do____ 1.0 |
| Copper sulfate | do____ 0.05 |
| Lard oil, v./v. | percent__ 3.2 |
| Tap water, qs. to 1000 milliliters. | |

After sterilization of this medium in an autoclave for 20 minutes at a pressure of 15 pounds per square inch, 25 ml. portions in 250 ml. Erlenmeyer flasks were inoculated with 1.0 ml. portions of the *S. aureofaciens* inoculum. The fermentation was carried out for 120 hours at 25° C. on a rotary shaker operating at 180 revolutions per minute. The contents of 35 of these flasks were pooled and killed by pasteurization. The neutral mash solids were collected by centrifugation and freeze-dried. A 5 gram portion of this freeze-dried mash was washed on a funnel four times with 25 ml. portions of ethyl ether. The 1,3,4,10,11,12-hexahydroxy - 6 - methylnaphthacene-2-carboxamide was extracted as follows: The ether-washed solids were extracted with a 100 ml. portion of tetrahydrofuran for 20 minutes on a rotary shaker and the extract was filtered. A second 20 minute extraction with a 50 ml. portion of tetrahydrofuran was carried out on the rotary shaker and the extract was filtered. The filtered extracts were pooled and evaporated to 5 ml., whereupon crystallization of the 1,3,4,10,11,12-hexahydroxy-6-methylnaphthacene-2-carboxamide occurred. These crystals were isolated by filtration, washed with ethyl ether and then air dried. The filtrate and washings from this isolation were pooled and evaporated to dryness. To the resulting crude 6,11-dihydro-11-keto-6-methyl - 3,6-10,12-tetrahydroxynapthacene-1,4-quinone-2-carboxamide were added 2 ml. of phenol, 1 ml. of hydriodic acid and 0.1 gram of potassium hypophosphite in a test tube. The mixture was heated to reflux for 5 minutes and then cooled to room temperature. The orange, crystalline, 1,3,4,10,11,12-hexahydroxy - 6 - methylnaphthacene-2-carboxamide which formed was collected by filtration and air dried. The total yield of 1,3,4,10,11,12 - hexahydroxy-6-methylnaphthacene-2-carboxamide was 46 milligrams.

EXAMPLE 2

Conversion of 1,3,4,10,11,12-hexahydroxy-6-methylnaphthacene-2-carboxamide to 7-chlorotetracycline Spores of *S. aureofaciens* NRRL 3013 were washed from an agar slant with sterile distilled water to form a suspension containing 60 million to 80 million spores per ml. A 0.33 ml. portion of this suspension was used to inoculate an 8 inch test tube containing 8 ml. of an inoculum prepared as described in Example 1. A fermentation medium of the following composition was prepared:

| | |
|---|---:|
| $(NH_4)_2SO_4$ | grams__ 6.7 |
| $CaCO_3$ | do____ 9.0 |
| $CoCl_2 \cdot 6H_2O$ | milligrams__ 5.0 |
| $NH_4Cl$ | grams__ 2.0 |
| $MnSO_4$ (70% technical grade) | do____ 0.10 |
| Cornsteep liquor | do____ 25.0 |
| Starch | do____ 52.5 |
| Corn flour | do____ 14.5 |
| Tap water, qs. to 1000 milliliters. | |

After sterilization of this medium, 25 ml. portions in 250 ml. Erlenmeyer flasks were inoculated with 1 ml. portions of the *S. aureofaciens* NRRL 3013 inoculum. The fermentation was carried out at 28° C. for 24 hours on a rotary shaker operating at 180 revolutions per minute. At this time each mash portion was transferred to an individual flask containing a solution of 10.7 mg. of 1,3,4,10,11,12-hexhahydroxy-6-methylnaphthacene-2-carboxamide in a mixture of 30 mg. of magnesium acetate and 1 ml. of dimethylsulfoxide. The fermentation was continued on the rotary shaker for an adidtional 96 hours at 28° C. At this time, biological assays of the mash indicated the presence of antibacterial activity corresponding to 264 micrograms of 7-chlorotetracycline per ml. This corresponds to a yield of 49% based on the compound added. The identity of the product as 7-chlorotetracycline was confirmed by paper chromatography in a butanol-pH3 phosphate buffer system. A control flask run in the same manner but with the addition of only 30 mg. of magnesium acetate and 1 ml. of dimethylsulfoxide and no 1,3,4,10,11,12-hexahydroxy - 6 - methylnaphthacene - 2 - carboxamide, showed no 7-chlorotetracycline.

EXAMPLE 3

Large scale preparation of 1,3,4,10,11,12-hexahydroxy-6-methylnaphthacene-2-carboxamide and conversion to 1-chlorotetracycline Spores of *S. aureofaciens* NRRL 3132 were washed from an agar slant to form a suspension containing 60 million to 80 million spores per ml. A 2.0 ml. portion of this suspension was used to inoculate 15 ml. of a medium prepared according to the following formulation:

| | Grams per liter |
|---|---:|
| Cornsteep liquor | 30 |
| Starch | 30 |
| Calcium carbonate | 10 |
| Ammonium sulfate | 2 |

Prior to inoculation the medium was sterilized by autoclaving for 20 minutes at 15 pounds per square inch. The inoculated 15 ml. portion was then incubated for 24 hours at 28° C. on a reciprocating shaker operating at 116 oscillations per minute. At this time a 0.1 ml. portion of this inoculum was used to inoculate a fresh 375 ml. portion of the same medium. This 375 ml. portion was incubated for 29 hours at 28° C. on the reciprocating shaker. Afermentation medium of the following composition was prepared:

| | |
|---|---:|
| Starch | grams per liter__ 40 |
| Cottonseed flour | do____ 35 |
| $CoCO_3$ | do____ 6 |
| Yeast | do____ 1 |
| $NH_4Cl$ | do____ 1 |
| $CuSO_4 \cdot 5H_2O$ | milligrams per liter__ 50 |
| Lard oil, v./v. | percent__ 3 |

After sterilization of this medium, a 7.5 liter portion in a 12 liter bottle was inoculated with the 375 ml. portion of *S. aureofaciens* inoculum. The fermentation was carried out at 25° C. for 120 hours with mechanical stirring and aeration with sterile air.

A 15 ml. portion of the heat-skilled harvest mash in a mixture of appropriate quantities of magnesium acetate and dimethylsulfoxide was added to 25 ml. of a 24 hour fermentation mash of *S. aureofaciens* NRRL 3013 and the fermentation was continued as described in Example 2. Biological assay of the whole harvest mash revealed a concentration of antibacterial activacterial activity corresponding to 187 micrograms of 7-chlorotetracycline per ml. The identity of the product as 7-chlorotetracycline was confirmed as described in Example 2.

What is claimed is:

1. A process for the concomitant production of 1,3,4,10,11,12-hexahydroxy - 6 - methylnaphthacene-2-carboxamide and 6,11-dihydro-11-keto-6-methyl-3,6,10,12-tetrahydroxynaphthacene-1,4-quinone - 2 - carboxamide which comprises cultivating a blocked mutant of *Sterptomyces aureofaciens* in an aqueous nutrient medium containing assimilable sources of carbohydrate, nitrogen and inorganic salts under submerged aerobic conditions until substantial quantities of 1,3,4,10,11,12-hexahydroxy-6-methylnaphthacene-2-carboxamide and 6,11-dihydro-11-keto-6-methyl-3,6,10,12 - tetrahydroxynaphthacene1,4-quinone-2-carboxamide are produced in said medium, and recovering the 1,3,4,10,11,12-hexahydroxy-6-methylnaphthacene-2-carboxamide and 6,11-dihydro-11-keto-6-methyl-3,6,10,12 - tetrahydroxynaphthacene-1,4-quinone-2-carboxamide so-produced; said blocked mutant of *S. aureofaciens* being characterized by having an absorption maximum at 450–470 m$\mu$ when the ultraviolet absorption spectrum is determined on a 0.2 N hydrochloric acid-in-dimethylformamide extract of the whole harvest mash.

2. A process for producing 1,3,4,10,11-12-hexahydroxy-6-methylnaphthacene - 2 - carboxamide which comprises cultivating a blocked mutant of *Streptomyces aureofaciens* in an aqueous nutrient medium containing assimilable sources of carbohydrate, nitrogen and inorganic salts under submerged aerobic conditions until substantial quantities of 1,3,4,10,11,12-hexahydroxy-6-methylnaphthacene-2-carboxamide are produced in said medium, and recovering the 1,3,4,10,11,12-hexahydroxy-6-methylnaphthacene-2-carboxamide so-produced; said blocked mutant of *S. aureofaciens* being characterized by having an absorption maximum at 450–470 m$\mu$ when the ultraviolet absorption spectrum is determined on a 0.2 N hydrochloric acid-in-dimethylformamide extract of the whole harvest mash.

3. A process for producing 6,11-dihydro-11-keto-6-methyl-3,6,10,12 - tetrahydroxynaphthacene-1,4-quinone-2-carboxamide which comprises cultivating a blocked mutant of *Streptomyces aureofaciens* in an aqueous nutrient medium containing an assimilable source of carbohydrate, nitrogen and inorganic salts under submerged aerobic conditions until substantial quantities of 6,11-dihydroy-11-keto-6-methyl - 13,6,10,12 - tetrahydroxynaphthacene-1,4-quinone-2-carboxamide are produced in said medium, and recovering the 6,11-dihydro-11-keto-6-methyl-3,6,10,12 - tetrahydroxynaphthacene-1,4-quinone-2-carboxamide so-produced; said blocked mutant of *S. aureofaciens* being characterized by having an absorption maximum at 450–470 m$\mu$ when the ultraviolet absorption spectrum is determined on a 0.2 N hydrochloric acid-in-dimethylformamide extract of the whole harvest mash.

References Cited

UNITED STATES PATENTS 3,226,305　12/1965　McCormick et al. _____ 195—80

MAURICE W. GREENSTEIN, *Primary Examiner.*